US012643374B2

(12) United States Patent
Lindquist et al.

(10) Patent No.: US 12,643,374 B2
(45) Date of Patent: Jun. 2, 2026

(54) VEHICLE CABIN DEHUMIDIFICATION CONTROL SYSTEM

(71) Applicant: FCA US LLC, Auburn Hills, MI (US)

(72) Inventors: Craig Lindquist, Shelby Township, MI (US); Mohammad N Nahid, Rochester Hills, MI (US); Ali-Sina Shojaei, Birmingham, MI (US); Francesco Lovuolo, Settimo Torinese (IT)

(73) Assignee: FCA US LLC, Auburn Hills, MI (US)

( * ) Notice: Subject to any disclaimer, the term of this patent is extended or adjusted under 35 U.S.C. 154(b) by 127 days.

(21) Appl. No.: 18/613,936

(22) Filed: Mar. 22, 2024

(65) Prior Publication Data

US 2025/0296405 A1     Sep. 25, 2025

(51) Int. Cl.
*B60H 1/32* (2006.01)
*B60H 1/00* (2006.01)

(52) U.S. Cl.
CPC ....... *B60H 1/3207* (2013.01); *B60H 1/00785* (2013.01); *B60H 2001/3257* (2013.01); *B60H 2001/3272* (2013.01); *B60H 2001/3283* (2013.01)

(58) Field of Classification Search
CPC ...... B60H 1/00278; B60H 2001/00307; B60H 2001/3272; B60H 2001/3255
See application file for complete search history.

(56) References Cited

U.S. PATENT DOCUMENTS

| | | | | |
|---|---|---|---|---|
| 5,007,245 | A * | 4/1991 | Defenbaugh | .......... B60H 1/323 62/227 |
| 5,669,226 | A * | 9/1997 | Kurahashi | .......... G05D 23/1917 236/78 D |
| 9,568,894 | B2 * | 2/2017 | Bryan | ................... G05B 13/021 |
| 10,040,337 | B2 * | 8/2018 | Miyakoshi | .............. F25B 13/00 |
| 10,625,560 | B2 * | 4/2020 | Miyakoshi | .......... B60H 1/3207 |
| 11,378,295 | B2 * | 7/2022 | Kami | ................... B60H 1/3213 |
| 2003/0037562 | A1 * | 2/2003 | Honda | ................... F25B 13/00 62/239 |
| 2005/0178523 | A1 * | 8/2005 | Itoh | ................... B60H 1/00385 165/42 |

(Continued)

FOREIGN PATENT DOCUMENTS

| | | | | |
|---|---|---|---|---|
| FR | 2808245 A1 * | 11/2001 | .............. | F25B 41/24 |
| JP | 2003320837 A * | 11/2003 | .............. | F25B 41/24 |

(Continued)

*Primary Examiner* — Nelson J Nieves
(74) *Attorney, Agent, or Firm* — Jeremy J. Klobucar

(57)     ABSTRACT

A thermal system includes a high temperature coolant loop thermally coupled to a heater core configured for thermal exchange with an airflow into a cabin of the vehicle, and an air conditioning (A/C) loop having a compressor, a condenser, a first expansion device for a heat exchanger, a second expansion device for a chiller, and a third expansion device for an evaporator. The high temperature coolant loop is thermally coupled to the condenser. A controller includes one or more processors and is programmed to perform a window fogging prevention operation by controlling a speed of the compressor such that (i) a coolant temperature at the heater core reaches a first predetermined target temperature, and (ii) a coolant temperature at the evaporator does not fall below a second predetermined target temperature.

20 Claims, 4 Drawing Sheets

(56)　　　　References Cited

U.S. PATENT DOCUMENTS

| | | | | |
|---|---|---|---|---|
| 2008/0034767 A1* | 2/2008 | Ziehr | B60H 1/00828 | |
| | | | 62/228.4 | |
| 2008/0307811 A1* | 12/2008 | Bryan | B60H 1/3211 | |
| | | | 62/228.3 | |
| 2009/0299529 A1* | 12/2009 | Hill | B60H 1/00785 | |
| | | | 700/275 | |
| 2011/0219787 A1* | 9/2011 | Keen | F25B 49/025 | |
| | | | 700/32 | |
| 2014/0223943 A1* | 8/2014 | Ichishi | B60H 1/3205 | |
| | | | 62/215 | |
| 2015/0330351 A1* | 11/2015 | Ragazzi | F02M 31/16 | |
| | | | 903/902 | |
| 2016/0109163 A1* | 4/2016 | Enomoto | B60H 1/32284 | |
| | | | 62/160 | |
| 2016/0209099 A1* | 7/2016 | Liu | F25B 49/025 | |
| 2016/0339760 A1* | 11/2016 | Dunn | H01M 10/625 | |

| | | | |
|---|---|---|---|
| 2017/0028813 A1* | 2/2017 | Enomoto | B60H 1/08 |
| 2018/0215231 A1* | 8/2018 | Porras | B60H 1/323 |
| 2021/0023906 A1* | 1/2021 | Crivellari | B60L 58/27 |
| 2021/0088243 A1* | 3/2021 | Goel | F25B 49/022 |
| 2021/0101451 A1* | 4/2021 | Kobayashi | F25B 49/02 |
| 2021/0323380 A1* | 10/2021 | Ishizeki | B60H 1/00921 |
| 2022/0029182 A1* | 1/2022 | Li | H01M 8/04358 |
| 2022/0161630 A1* | 5/2022 | Lindquist | B60L 1/003 |
| 2023/0070430 A1* | 3/2023 | Michikawauchi | |
| | | | B60H 1/32284 |
| 2024/0010045 A1* | 1/2024 | Muto | B60H 1/32284 |
| 2024/0059125 A1* | 2/2024 | Miyakoshi | B60H 1/00921 |
| 2024/0246387 A1* | 7/2024 | Michikawauchi | |
| | | | B60H 1/32284 |

FOREIGN PATENT DOCUMENTS

| | | | | |
|---|---|---|---|---|
| WO | WO-2018043152 A1 * | 3/2018 | | B60H 3/024 |
| WO | WO-2022115976 A1 * | 6/2022 | | B60H 1/00392 |

* cited by examiner

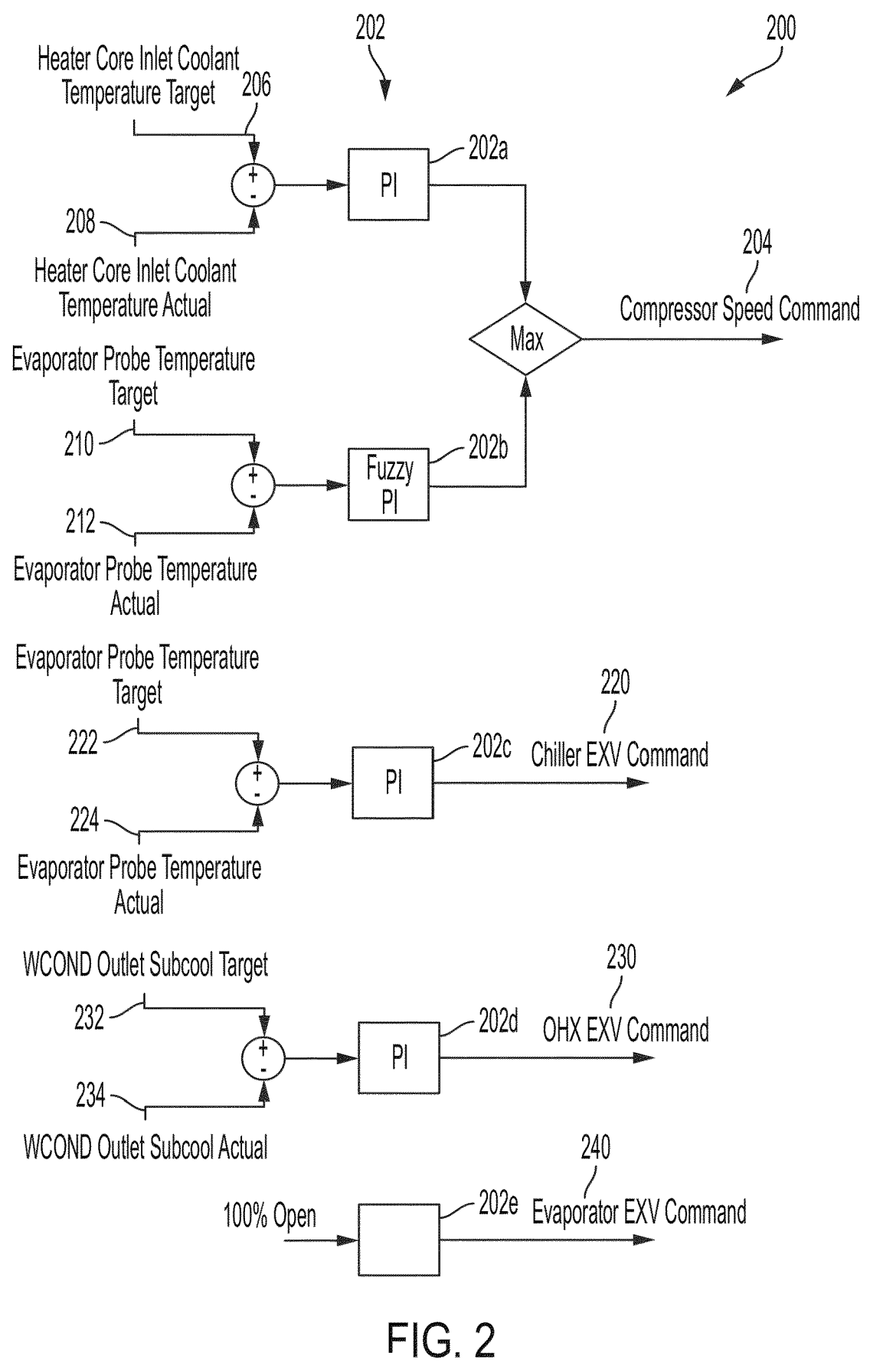

Heater Core Inlet Coolant
Temperature Target — 206

208 —
Heater Core Inlet Coolant
Temperature Actual

PI — 202a

Evaporator Probe Temperature
Target

210 —

212 —
Evaporator Probe Temperature
Actual

Fuzzy PI — 202b

Max

Compressor Speed Command — 204

Evaporator Probe Temperature
Target

222 —

224 —
Evaporator Probe Temperature
Actual

PI — 202c

Chiller EXV Command — 220

WCOND Outlet Subcool Target

232 —

234 —
WCOND Outlet Subcool Actual

PI — 202d

OHX EXV Command — 230

100% Open

202e — Evaporator EXV Command — 240

FIG. 2

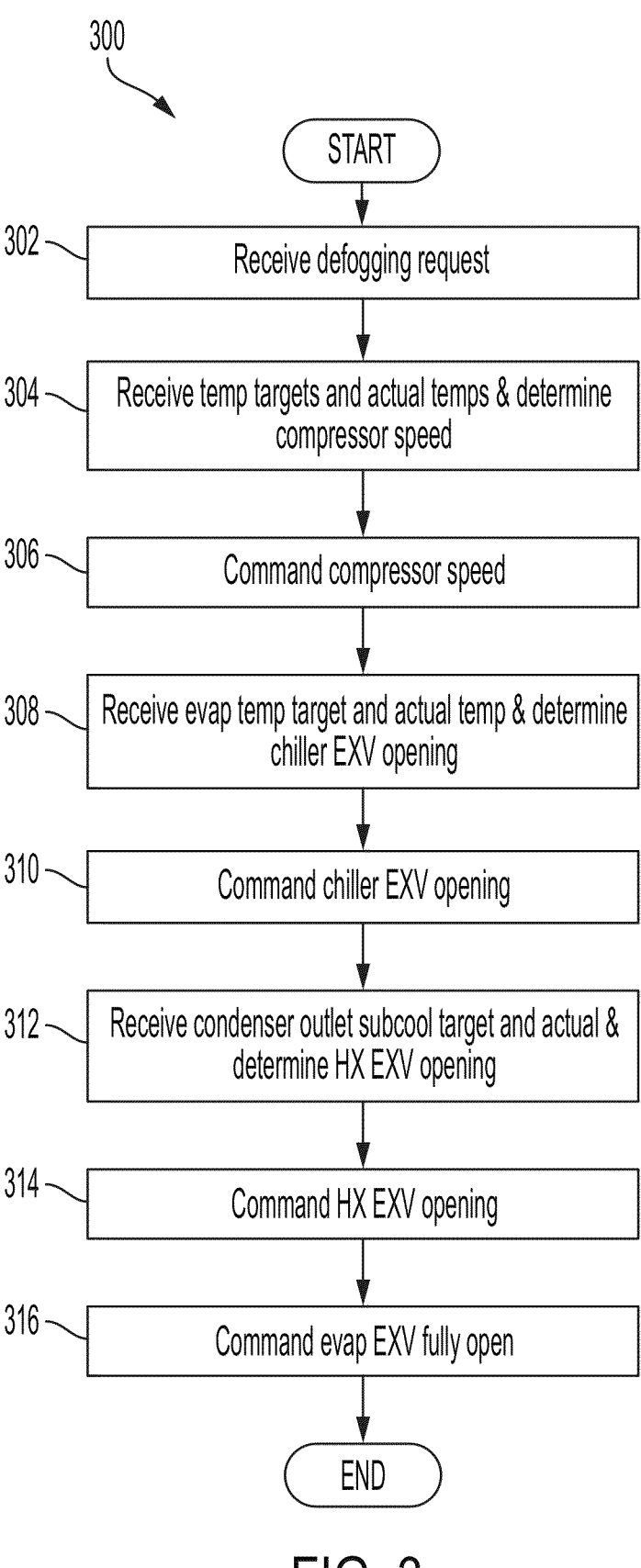

300

START

302 — Receive defogging request

304 — Receive temp targets and actual temps & determine compressor speed

306 — Command compressor speed

308 — Receive evap temp target and actual temp & determine chiller EXV opening

310 — Command chiller EXV opening

312 — Receive condenser outlet subcool target and actual & determine HX EXV opening 314 — Command HX EXV opening 316 — Command evap EXV fully open

END

FIG. 3

VEHICLE CABIN DEHUMIDIFICATION CONTROL SYSTEM

FIELD

The present application relates generally to vehicle thermal systems and, more particularly, to vehicle thermal systems for cabin dehumidification control.

BACKGROUND

In some vehicles, in order to prevent fogging of the vehicle windows, the air entering the cabin must be cooled to remove humidity and then reheated. In a conventional heating/cooling system, this is accomplished by running the A/C compressor to cool the air passing across an evaporator and then subsequently passing the air across a heater core or electric heating element to reheat the air. The heating and cooling functions in this conventional system are independently controlled. However, in a heat pump system, the A/C compressor is responsible for both heating and cooling simultaneously. Since the heating and cooling are no longer independent, conventional control may not prevent fogging. Thus, while such conventional systems do work well for their intended purpose, there is a desire to provide improvement in the relevant art.

SUMMARY

According to one example aspect of the invention, a thermal system for a vehicle is provided. In one exemplary implementation, the thermal system includes a high temperature coolant loop thermally coupled to a heater core configured for thermal exchange with an airflow into a cabin of the vehicle, and an air conditioning (A/C) loop having a compressor, a condenser, a first expansion device for a heat exchanger, a second expansion device for a chiller, and a third expansion device for an evaporator. The high temperature coolant loop is thermally coupled to the condenser. A controller includes one or more processors and is programmed to perform a window fogging prevention operation by controlling a speed of the compressor such that (i) a coolant temperature at the heater core reaches a first predetermined target temperature, and (ii) a coolant temperature at the evaporator does not fall below a second predetermined target temperature.

In addition to the foregoing, the described thermal system may include one or more of the following features: wherein when performing the window fogging prevention operation, the controller is further programmed to (i) control an opening of the second expansion device, such that a portion of coolant bypasses the evaporator, and such that the coolant temperature of the evaporator does not fall below the second predetermined target temperature, (ii) control an opening of the first expansion device such that a coolant temperature at the condenser reaches a third predetermined temperature target, and/or (iii) control an opening of the third expansion device to a fully open position.

In addition to the foregoing, the described thermal system may include one or more of the following features: wherein the A/C loop further includes a first branch directed to the chiller that bypasses the evaporator and a second branch directed to the evaporator; wherein the first and second branches diverge at a location downstream of the heat exchanger and upstream of the evaporator and the chiller, and wherein the first and second branches converge downstream of the chiller and the evaporator to subsequently provide coolant to an inlet of the compressor; and wherein the second predetermined target temperature is the freezing point of water.

In addition to the foregoing, the described thermal system may include one or more of the following features: wherein the heat exchanger is disposed downstream of the condenser and upstream of the chiller and the evaporator; a low temperature coolant loop thermally coupled to an electric drive module; a battery system coolant loop thermally coupled to a high voltage battery system; wherein the chiller is thermally coupled to the battery system coolant loop to provide thermal conditioning of the high voltage battery system; and wherein the low temperature coolant loop is fluidly connected to the high temperature coolant loop.

In addition to the foregoing, the described thermal system may include one or more of the following features: wherein the battery system coolant loop is selectively fluidly coupled to the low temperature coolant loop; wherein the A/C loop is fluidly separate from the high temperature coolant loop, the low temperature coolant loop, and the battery system coolant loop; wherein the second expansion device and the chiller are disposed on a first branch of the A/C loop, and the third expansion device and the evaporator are disposed on a second branch of the A/C loop; and wherein the high temperature coolant loop includes a high voltage heater, and wherein the high voltage heater is not utilized during the window fogging prevention operation.

According to another example aspect of the invention, a method of preventing window fogging in a vehicle having a thermal system is provided. In one implementation, the thermal system includes (i) a high temperature coolant loop thermally coupled to a heater core configured for thermal exchange with an airflow into a cabin of the vehicle, and (ii) an air conditioning (A/C) loop having a compressor, a condenser, a first expansion device for a heat exchanger, a second expansion device for a chiller, and a third expansion device for an evaporator, wherein the high temperature coolant loop is thermally coupled to the condenser. In one example, the method includes controlling, by a controller having one or more processors, a speed of the compressor such that (i) a coolant temperature at the heater core reaches a first predetermined target temperature, and (ii) a coolant temperature at the evaporator does not fall below a second predetermined target temperature.

In addition to the foregoing, the described method may include one or more of the following features: controlling, by the controller, an opening of the second expansion device, such that a portion of coolant bypasses the evaporator, and such that the coolant temperature of the evaporator does not fall below the second predetermined target temperature; controlling, by the controller, an opening of the first expansion device such that a coolant temperature at the condenser reaches a third predetermined temperature target; and controlling, by the controller, an opening of the third expansion device to a fully open position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a schematic control diagram of a fogging prevention operation of the thermal system shown in FIG. 1, in accordance with the principles of the present disclosure;

FIG. 3 is an example flow control diagram of the fogging prevention operation, in accordance with the principles of the present disclosure.

DETAILED DESCRIPTION

The present application is directed to a thermal system for an electric vehicle. The thermal system includes an air conditioning (A/C) coolant loop having a condenser, a chiller, expansion valves, an evaporator, and an associated controller. The controller regulates refrigerant flow through the evaporator by controlling the compressor speed according to the heating demand, but increases the speed until the heater core coolant temperature target is reached. At the same time, the system prevents evaporator freeze by utilizing a variable orifice at the chiller inlet as a bypass to regulate the amount of refrigerant that goes through the evaporator.

Figure 1:
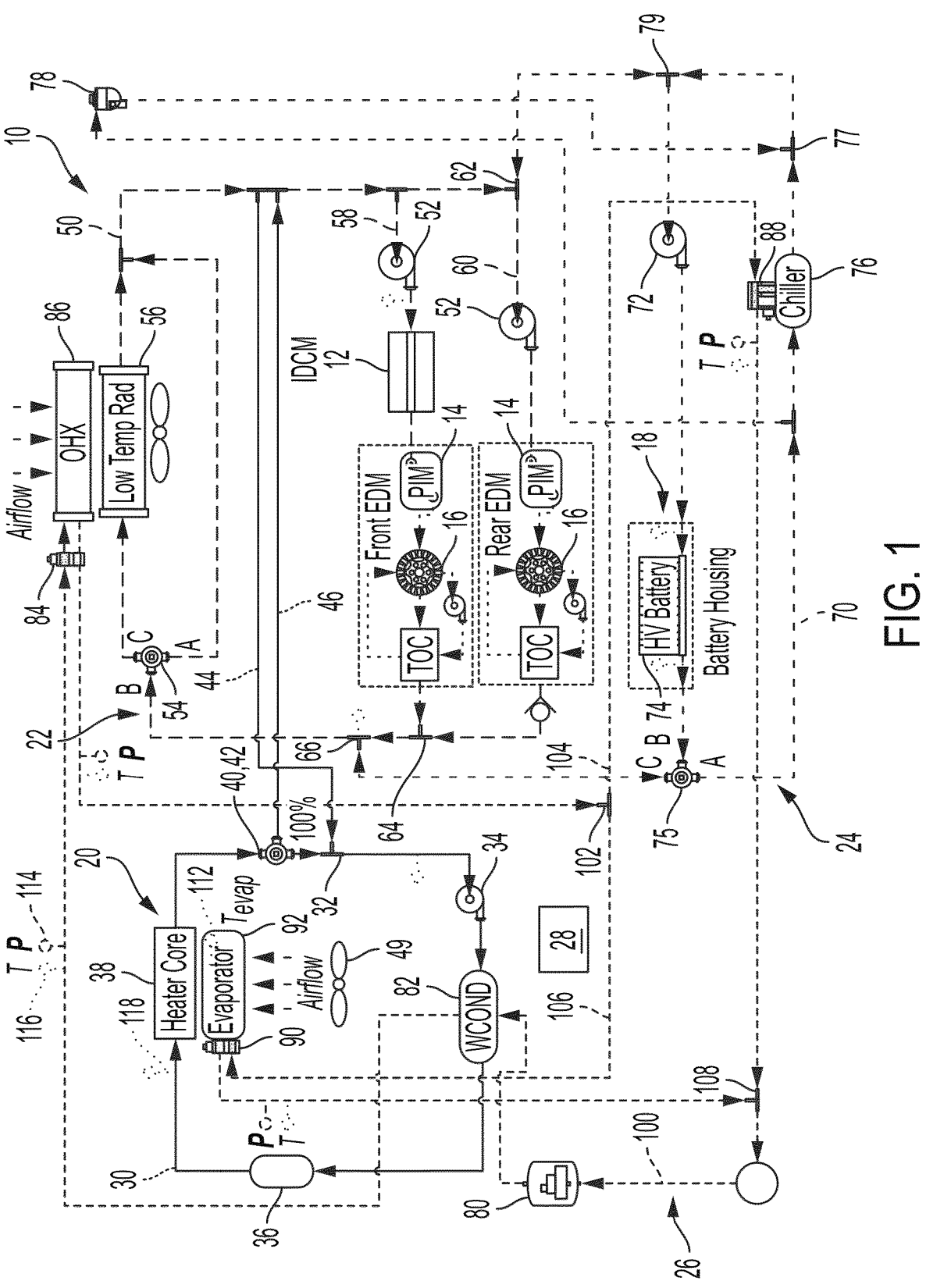
FIG. 1 is a schematic diagram of an example vehicle thermal system in accordance with the principles of the present disclosure.

With initial reference to FIG. 1, an example vehicle thermal system is illustrated and generally identified at reference numeral 10. The thermal system 10 is configured to provide heating/cooling to various components of the vehicle such as power electronics including an integrated dual charging module (IDCM) 12, power inverter modules (PIM) 14, electric motors 16, and a high voltage (HV) battery system 18. The IDCM 12 includes a DC/DC converter that converts high voltage from the battery system 18 to power lower voltage electrical loads and charge a low voltage battery, and an on-board charging module that converts AC power from the wall to DC to charge the battery system 18 when the vehicle is plugged in.

In the example embodiment, the thermal system 10 generally includes a high temperature coolant loop 20, a low temperature coolant loop 22, a battery system coolant loop 24, and an air conditioning coolant loop 26. As shown, the A/C loop 26 is fluidly isolated while the high temperature loop 20, the low temperature loop 22, and the battery system loop 24 are selectively fluidly coupled, as described herein in more detail. The thermal system 10 additionally includes a controller 28 such as an engine control unit (ECU), which is in signal communication with various components, valves, and sensors.

With continued reference to FIG. 1, in one example implementation, the high temperature loop 20 circulates a heat transfer fluid or coolant (e.g., water) and generally includes a main circuit 30 having a first junction 32, a pump 34, a high voltage heater 36, a heater core 38, and a second junction 40 with a three-way valve 42. As described herein in more detail, the main circuit 30 is configured to selectively receive heated coolant at the first junction 32 via a branch conduit 44, which is fluidly coupled to the low temperature loop 22. In some operations, the coolant is directed to the low temperature loop 22 via a branch conduit 46 fluidly connected to the second junction 40 and valve 42.

The pump 34 is configured to circulate the coolant around the main circuit 30, and the heater 36 is configured to selectively heat the coolant passing through the main circuit 30 when additional heating is desired. The heater core 38, which is a passenger cabin heat exchanger operably associated with a blower 49, is configured to receive heated coolant to thereby provide heating to air supplied to the passenger cabin by blower 49.

In the example implementation, the low temperature loop 22 is fluidly coupled to the high temperature loop 20 and selectively circulates the coolant around a main circuit 50 to selectively provide cooling to the IDCM 12, PIMs 14, and electric motors 16. In the illustrated example, the low temperature loop 22 generally includes pumps 52, a three-way valve 54, and a low temperature radiator 56. The pumps 52 are configured to circulate the coolant around the main circuit 50 to the valve 54, which is configured to selectively bypass the low temperature radiator 56. Controller 28 is configured to control valve 54 to selectively direct coolant through the first outlet 'A', the second outlet 'C', or a combination thereof.

As shown in FIG. 1, in the low temperature loop 22, coolant from the low temperature radiator 56 is directed to a first branch 58 by one pump 52, and a second branch 60 by the other pump 52. The IDCM 12, one PIM 14, and one electric motor 16 are thermally coupled to the first branch 58, while another PIM 14 and electric motor 16 are thermally coupled to the second branch 60. The second branch 58 is fluidly coupled to the battery system loop 24 at a first junction 62. The first and second branches 58, 60 converge at a second junction 64, which then converge with the battery system loop 24 at a third junction 66.

With continued reference to FIG. 1, the battery system loop 24 will be described in more detail. In the example embodiment, the battery system loop 24 generally includes a main circuit 70, a pump 72, a HV battery 74, a three-way valve 75, and a chiller 76. Coolant is received from a first junction 77, which also receives coolant from an overflow bottle 78, and is subsequently directed to a second junction 79 fluidly coupled to the low temperature loop 22. The pump 72 receives coolant from the second junction 79 and is configured to circulate the coolant around the main circuit 70.

The coolant from pump 72 is directed to the HV battery 74 for cooling thereof. The heated coolant is then directed to three-way valve 75, and controller 28 is configured to control valve 75 to selectively direct coolant through the first outlet 'A', the second outlet 'C', or a combination thereof. Coolant from the second outlet 'C' is directed to the low temperature loop 22, and coolant from the first outlet 'A' is directed to the chiller 76.

The chiller 76 is thermally coupled to the A/C loop 26 and is configured to selectively utilize the A/C refrigerant to indirectly cool the coolant of the battery system loop 24 passing therethrough. Such thermal transfer is configured to subsequently cool the battery system 18, for example, during high ambient temperatures. Although not shown, a heater may be configured to selectively heat the coolant passing through the main circuit 70 to subsequently heat the battery system 18 when desired (e.g., during a cold start).

With continued reference to FIG. 1, in the example implementation, A/C loop 26 is a standard vehicle air conditioning system that generally includes a compressor 80, a condenser 82, a first expansion device 84 associated with a heat exchanger 86 (e.g., a radiator), a second expansion device 88 associated with the chiller 76, and a third expansion device 90 associated with an evaporator 92.

In operation, a suction line 100 provides gaseous refrigerant to compressor 80, which subsequently compresses the refrigerant. The compressed and heated refrigerant is then directed to the condenser 82 where the heat from compression is dissipated and the refrigerant condenses to a liquid. The liquid refrigerant is then directed to the first expansion device 84, which is a thermal expansion valve with a selectively controlled orifice to control expansion of the liquid refrigerant before entering the heat exchanger 86. In the example embodiment, heat exchanger 86 is a radiator disposed for ambient air heat exchange (e.g., at a front of the vehicle). The refrigerant is then directed to a first junction 102, which divides the coolant flow into a first branch 104 and a second branch 106.

The first branch 104 is configured to supply refrigerant to the second expansion device 88, which is a thermal expansion valve with an integrated shutoff valve. When the shutoff valve is in a closed position, refrigerant is prevented from flowing through first branch 104. When the shutoff valve is in an open position, refrigerant is able to flow through the first branch 104 to the second expansion device 88 where it is reduced in pressure and vaporized, thereby reducing the temperature of the refrigerant. The cooled vapor refrigerant is then supplied to chiller 76, where it is evaporated to provide cooling to the coolant circulating within the battery system loop 24. The resulting gaseous, warmed refrigerant is then returned to the compressor 80 via a second junction 108 to the suction line 100 where the cycle is then repeated.

The second branch 106 is configured to supply refrigerant to the third expansion device 90 (e.g., expansion valve), where it is reduced in pressure and vaporized, thereby reducing the temperature of the refrigerant. The cooled vapor refrigerant is then supplied to evaporator 92, where it is evaporated to providing cooling to the cabin air from blower 49. The resulting gaseous, warmed refrigerant is then returned to the compressor 80 via suction line 100 and the cycle is repeated.

As previously described, the thermal system 10 is configured to operate as a heat pump and control dehumidification to facilitate preventing fogging of the vehicle windows. In order to accomplish this operation, controller 28 is in signal communication with compressor 80, chiller 76, the expansion devices 84, 88, and 90, a coolant temperature sensor 110, an evaporator air temperature sensor 112, a condenser outlet refrigerant pressure sensor 114, a condenser outlet refrigerant temperature sensor 116, and a heater core inlet temperature sensor 118. It will be appreciated that control may include additional components/sensors, such as those shown in FIG. 1. In this way, controller 28 can control expansion devices 84, 88, 90 based at least in part on one or more signals from the sensors 112-118 or other sensor to provide a heat pump fog prevention operation while preventing freezing of the evaporator 92.

With reference now to FIG. 2, an example control diagram 200 is illustrated for operating the thermal system 10 to prevent interior cabin window fogging while also preventing freezing of the evaporator 92. In particular, the thermal system 10 is configured to control the speed of compressor 80 according to user heating demand, but increases the compressor speed until a predetermined heater core coolant temperature target is reached. At the same time, the system 10 prevents evaporator freeze by using the variable orifice expansion device 88 at the chiller inlet as a bypass to regulate the amount of refrigerant that goes through the evaporator 92. By limiting the amount of refrigerant passing therethrough, the thermal system 10 can control and prevent evaporator freezing. As such, the use of the existing expansion device 88 obviates the need for additional/specialized hardware.

As shown in FIG. 2, the thermal system 10 utilizes a plurality of controllers 202 to perform the fogging prevention operation. A first controller 202a and a second controller 202b are configured to provide a compressor speed command 204. The first controller 202a receives two inputs. The first input 206 is a heater core inlet coolant temperature target, for example from an HVAC system controller based on user comfort settings. The second input 208 is a heater core inlet coolant temperature actual (e.g., from temperature sensor 118). The controller 202a receives inputs 206, 208 and determines the compressor speed necessary to achieve the coolant target at the outlet of water condenser 82. In the example embodiment, the first controller 202a is a proportional integral controller, but it will be appreciated that it may be any suitable type of controller that enables thermal system 10 to function as described herein.

The second controller 202b receives two inputs. The first input 210 is an evaporator probe temperature target, for example from the HVAC system controller based on user comfort settings. The second input 212 is an evaporator probe temperature actual (e.g., from temperature sensor 112). The controller 202b receives the two inputs 210, 212 and determines the compressor speed necessary to achieve the evaporator temperature target. In the example embodiment, the second controller 202b is a fuzzy proportional integral controller, but it will be appreciated that it may be any suitable type of controller that enables thermal system 10 to function as described herein.

At 214, the thermal system 10 receives the inputs from the first and second controllers 202a,b and determines which input is the maximum speed needed for achieving the coolant temperature and evaporator temperature targets. Based on this determination, the thermal system 10 then provides the compressor speed command 204 to control the speed of compressor 80 to achieve both coolant temperature and evaporator temperature targets simultaneously. In the example embodiment, higher compressor speed results in warmer coolant and a colder evaporator, and one of the two targets will be overachieved.

A third controller 202c is configured to provide a chiller EXV command 220, which is tells the chiller expansion device 88 how much to open. In one example, if the evaporator target is overachieved, the evaporator 92 may begin to accumulate ice, which may block airflow. Thus, opening the chiller expansion device 88 more reduces refrigerant flow to the evaporator 92, thereby preventing freezing. The third controller 202c receives two inputs 222, 224. The first input 222 is the evaporator probe temperature target (e.g., 210). The second input 224 is the evaporator probe temperature actual (e.g., 212). Accordingly, the controller 202c receives inputs 222, 224 and commands the chiller expansion device 88 to open more to bypass the evaporator and prevent freezing thereof. For example, as the evaporator temperature approaches the freezing point, the chiller expansion device 88 will be opened. Since controller 202c is a feedback controller, as long as the temperature remains too low in the evaporator, the chiller expansion device 88 will open more and more. In the example embodiment, the third controller 202c is a proportional integral controller, but it will be appreciated that it may be any suitable type of controller that enables thermal system 10 to function as described herein.

A fourth controller 202d is configured to provide an OHX EXV command 230, which is a feedback control to open the expansion device 84 to achieve a subcooling target at the outlet of condenser 82. The fourth controller 202d receives two inputs 232, 234. The first input 232 is the condenser outlet subcool target (e.g., from temperature sensor 116). In the example embodiment, subcooling is the delta temperature below the point where the refrigerant transitions from gas to liquid (saturation temperature), which varies according to the refrigerant pressure. Colder liquid exiting the condenser 82 and entering the heat exchanger 86 results in more potential for heat transfer in the heat exchanger 86. Attempting to target too much subcool, however, may overly restrict the flow and reduce heat transfer, so adjustment is required (e.g., through feedback control).

The second input 234 is the condenser outlet subcool actual (e.g., from temperature sensor 116). The controller 202d receives inputs 232, 234 and commands a desired opening of the expansion device 84. For example, opening the expansion device 84 reduces subcooling, and closing the expansion device 84 increases subcooling. In the example embodiment, the fourth controller 202d is a proportional integral controller, but it will be appreciated that it may be any suitable type of controller that enables thermal system 10 to function as described herein.

A fifth controller 202e is configured to provide an evaporator EXV command 240. While operating in the fogging prevention operation, thermal system 10 commands the controller 202e to keep expansion device 90 completely or substantially open to reduce or prevent coolant expansion at the evaporator 92 to prevent freezing thereof.

In this way, the thermal system 10 with controllers 202 is configured to receive inputs indicating target and actual temperatures of the various system components. The system 10 then provides: (i) the compressor speed command 204 to control the speed of compressor 80 to thereby control the coolant temperature and the evaporator temperature, (ii) the chiller EXV command 220 to control the degree of opening of the chiller expansion device 88 to thereby control evaporator temperature, (iii) the OHX EXV command 230 to control the degree of opening of the expansion device 84 of heat exchanger 86 to thereby control the condenser outlet subcool temperature, and (iv) the evaporator EXV command 240 to control the degree of opening of the evaporator expansion device 90 (e.g., 100% open).

As such, in the fogging prevention operation, thermal system 10 is configured to provide cooling and dehumidification with the evaporator 90 and subsequent reheating via the heater core 38 for defogging/fog prevention within the vehicle cabin. Advantageously, the system 10 does not need the use of or require heater 36, which may be an inefficient use of electrical power. The thermal system 10 directs heater core coolant through the condenser 82 to warm the coolant directed to the heater core 38. The system 10 controls the speed of compressor 80 according to the heating demand, but also increases the speed until the heater core coolant temperature target is reached. At the same time, the thermal system 10 prevents evaporator freeze by controlling the variable orifice at expansion device 88 to direct refrigerant to the chiller 76, thus bypassing the evaporator 92, since too much refrigerant to the evaporator 92 could cause freezing while dehumidifying the airflow from blower 49.

Referring now to FIG. 3, a flow diagram of an example method 300 of operating thermal system 10 to prevent cabin window fogging is illustrated. The method begins at 302 where controller 28 ("control") receives a request for defogging. This request may come directly from a user or automatically from a vehicle system (e.g., HVAC system) that detects a fogging condition. At step 304, control receives heater core inlet coolant temperature target 206, heater core inlet coolant temperature actual 208, evaporator probe temperature target 210, and evaporator probe temperature actual

212. Based on these inputs, control determines a maximum compressor speed to meet the heating demand from step 302 while also ensuring the heater core coolant temperature target is reached. At step 306, control commands the compressor 80 to the determined speed.

At step 308, control receives the evaporator probe temperature target 222 and the evaporator probe temperature actual 224. Based on these inputs, control determines how much to open the expansion device 88 to bypass the evaporator 92 to prevent freezing thereof. At step 310, control commands the expansion device 88 to the determined opening.

At step 312, control receives the condenser outlet subcool target 232 and the condenser outlet subcool actual 234. Based on these inputs, control determines how much to open the expansion device 84 to control refrigerant flow through the condenser 82 to reach the refrigerant subcool target at the condenser 82. At step 314, control commands the expansion device 84 to the determined opening. At step 316, control commands the expansion device 90 to fully open to further prevent freezing of the evaporator 92. Control then ends or returns to step 302.

Figure 4:
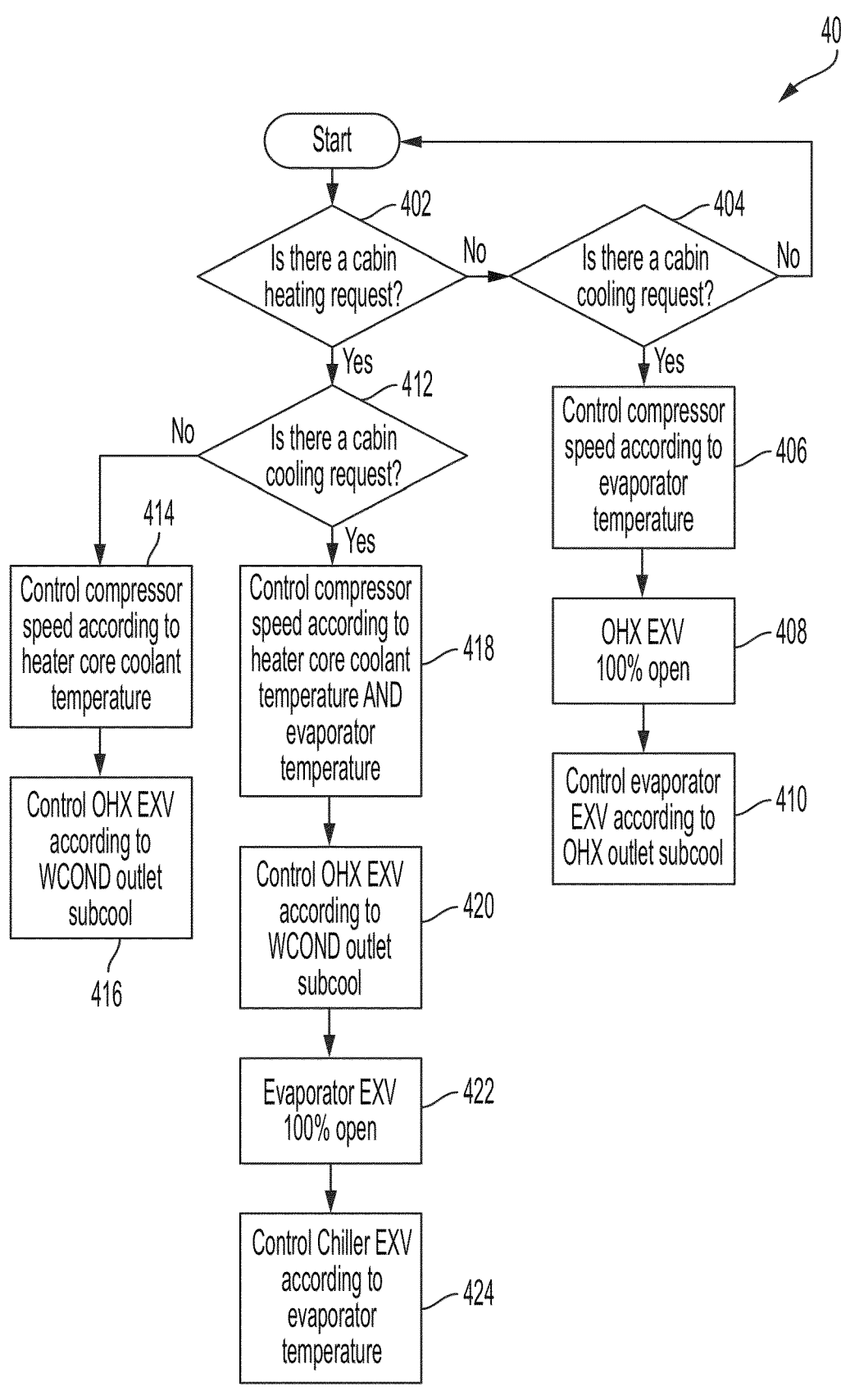
FIG. 4 is a flow control diagram of an example operation of the thermal system shown in FIG. 1, in accordance with the principles of the present disclosure.

Referring now to FIG. 4, a flow diagram of another example method 400 of operating thermal system 10 is illustrated. The method begins at 402 where controller 28 ("control") determines if there is a cabin heating request. This request may come from a vehicle user or other vehicle system. If no, control proceeds to step 404. If yes, control proceeds to step 412.

At step 404, control determines if there is a cabin cooling request. If no, control ends or loops to step 402. If yes, at step 406, controller 28 controls a speed of the compressor 80 according to the temperature of evaporator 92 to meet the cooling demand. At step 408, controller 28 controls the first expansion device 90 to a substantially or fully open position. At step 410, controller 28 controls the evaporator expansion device 90 opening according to the heat exchanger 86 outlet subcool temperature. For example, it is desirable to always have a subcooled liquid at the outlet of the condenser 82, since in heating modes the condenser 82 acts as a condenser, and in A/C mode the heat exchanger 86 acts as a condenser. Control then ends or returns to step 402.

Returning to step 412, control determines if there is a cabin cooling request in addition to the cabin heating request. If no, control proceeds to step 414. If yes, control proceeds to step 418.

At step 414, controller 28 controls a speed of the compressor 80 according to the heater core coolant temperature to meet the heating demand. At step 416, controller 28 controls the first expansion device 84 opening according to the condenser 82 outlet subcool target temperature.

Returning to step 418, controller 28 controls the speed of compressor 80 according to the heater core coolant temperature and evaporator temperature. At step 420, controller 28 controls the first expansion device 84 opening according to the condenser 82 outlet subcool target temperature. At step 422, controller 28 controls the evaporator expansion device 98 to a fully open position. At step 424, controller 28 controls the second expansion device 88 according to the evaporator temperature. Control then ends or returns to step 402.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A thermal system for a vehicle, comprising:
a high temperature coolant loop thermally coupled to a heater core configured for thermal exchange with an airflow into a cabin of the vehicle;
an air conditioning (A/C) loop having a compressor, a condenser, a first expansion device for a heat exchanger, a second expansion device for a chiller, and a third expansion device for an evaporator;
wherein the high temperature coolant loop is thermally coupled to the condenser; and
a controller having one or more processors, the controller programmed to perform a window fogging prevention operation comprising:
    receiving a first input indicative of a heater core inlet coolant temperature target;
    receiving a second input indicative of a heater core inlet coolant temperature actual;
    determining, based on the first and second inputs, a first compressor speed necessary to achieve the heater core inlet coolant temperature target at an outlet of the condenser;
    receiving a third input indicative of an evaporator probe temperature target;
    receiving a fourth input indicative of an evaporator probe temperature actual;
    determining, based on the third and fourth inputs, a second compressor speed necessary to achieve the evaporator probe temperature target;
    determining which of the first and second compressor speeds is higher; and
    operating the compressor at the higher of the first and second compressor speeds such that (i) a coolant temperature at the heater core reaches a first predetermined target temperature, and (ii) a coolant temperature at the evaporator does not fall below a second predetermined target temperature.

2. The thermal system of claim 1, wherein when performing the window fogging prevention operation, the controller is further programmed to:
control an opening of the second expansion device, based on the third and fourth inputs, such that a portion of coolant bypasses the evaporator, and such that the coolant temperature of the evaporator does not fall below the second predetermined target temperature.

3. The thermal system of claim 2, wherein when performing the window fogging prevention operation, the controller is further programmed to:
receive a fifth input indicative of a subcool target at an outlet of the condenser;
receive a sixth input indicative of a subcool actual at the outlet of the condenser; and
control an opening of the first expansion device, based on the fifth and sixth inputs, such that a coolant temperature at the condenser reaches the subcool target.

4. The thermal system of claim 3, wherein when performing the window fogging prevention operation, the controller is further programmed to:
control an opening of the third expansion device to a fully open position.

5. The thermal system of claim 1, wherein the A/C loop further comprises:
a first branch directed to the chiller that bypasses the evaporator; and
a second branch directed to the evaporator.

6. The thermal system of claim 5, wherein the first and second branches diverge at a location downstream of the heat exchanger and upstream of the evaporator and the chiller; and
wherein the first and second branches converge downstream of the chiller and the evaporator to subsequently provide coolant to an inlet of the compressor.

7. The thermal system of claim 2, wherein the second predetermined target temperature is the freezing point of water.

8. The thermal system of claim 1, wherein the heat exchanger is disposed downstream of the condenser and upstream of the chiller and the evaporator.

9. The thermal system of claim 1, further comprising a low temperature coolant loop thermally coupled to an electric drive module.

10. The thermal system of claim 9, further comprising a battery system coolant loop thermally coupled to a high voltage battery system.

11. The thermal system of claim 10, wherein the chiller is thermally coupled to the battery system coolant loop to provide thermal conditioning of the high voltage battery system.

12. The thermal system of claim 10, wherein the low temperature coolant loop is fluidly connected to the high temperature coolant loop.

13. The thermal system of claim 12, wherein the battery system coolant loop is selectively fluidly coupled to the low temperature coolant loop.

14. The thermal system of claim 13, wherein the A/C loop is fluidly separate from the high temperature coolant loop, the low temperature coolant loop, and the battery system coolant loop.

15. The thermal system of claim 1, wherein the second expansion device and the chiller are disposed on a first branch of the A/C loop, and the third expansion device and the evaporator are disposed on a second branch of the A/C loop.

16. The thermal system of claim 1, wherein the high temperature coolant loop includes a high voltage heater, and wherein the high voltage heater is not utilized during the window fogging prevention operation.

17. A method of preventing window fogging in a vehicle having a thermal system that includes (i) a high temperature coolant loop thermally coupled to a heater core configured for thermal exchange with an airflow into a cabin of the vehicle, and (ii) an air conditioning (A/C) loop having a compressor, a condenser, a first expansion device for a heat exchanger, a second expansion device for a chiller, and a third expansion device for an evaporator, wherein the high temperature coolant loop is thermally coupled to the condenser, the method comprising:

receiving a first input indicative of a heater core inlet coolant temperature target;

receiving a second input indicative of a heater core inlet coolant temperature actual;

determining, based on the first and second inputs, a first compressor speed necessary to achieve the heater core inlet coolant temperature target at an outlet of the condenser;

receiving a third input indicative of an evaporator probe temperature target;

receiving a fourth input indicative of an evaporator probe temperature actual;

determining, based on the third and fourth inputs, a second compressor speed necessary to achieve the evaporator probe temperature target;

determining which of the first and second compressor speeds is higher; and operating, by a controller having one or more processors, the compressor at the higher of the first and second compressor speeds such that (i) a coolant temperature at the heater core reaches a first predetermined target temperature, and (ii) a coolant temperature at the evaporator does not fall below a second predetermined target temperature.

18. The method of claim 17, further comprising:

controlling, by the controller, an opening of the second expansion device, based on the third and fourth inputs, such that a portion of coolant bypasses the evaporator, and such that the coolant temperature of the evaporator does not fall below the second predetermined target temperature.

19. The method of claim 18, further comprising:

receiving a fifth input indicative of a subcool target at an outlet of the condenser;

receiving a sixth input indicative of a subcool actual at the outlet of the condenser; and controlling, by the controller, an opening of the first expansion device, based on the fifth and sixth inputs, such that a coolant temperature at the condenser reaches the subcool target.

20. The method of claim 19, further comprising controlling, by the controller, an opening of the third expansion device to a fully open position.

* * * * *